United States Patent
Dedering

(10) Patent No.: US 10,646,799 B2
(45) Date of Patent: May 12, 2020

(54) FILTER MEDIUM FOR AN OIL FILTER

(75) Inventor: Michael Dedering, Morsbach-Lichtenberg (DE)

(73) Assignee: IBS FILTRAN KUNSTSTOFF-/METALLERZEUGNISSE GMBH, Morsbach (DE)

(*) Notice: Subject to any disclaimer, the term of this patent is extended or adjusted under 35 U.S.C. 154(b) by 1636 days.

(21) Appl. No.: 12/482,340

(22) Filed: Jun. 10, 2009

(65) Prior Publication Data

US 2010/0147755 A1 Jun. 17, 2010

(30) Foreign Application Priority Data

Jun. 10, 2008 (DE) .......................... 10 2008 027 663

(51) Int. Cl.
- *F01M 11/03* (2006.01)
- *B01D 29/01* (2006.01)
- *B01D 29/56* (2006.01)

(52) U.S. Cl.
CPC ............. *B01D 29/01* (2013.01); *B01D 29/56* (2013.01); *B01D 2201/04* (2013.01)

(58) Field of Classification Search
CPC ............................ B01D 29/01; B01D 2201/04
USPC ................. 210/167.08, 493.1, 488, 314, 428
See application file for complete search history.

(56) References Cited

U.S. PATENT DOCUMENTS

| | | | |
|---|---|---|---|
| 3,458,977 A * | 8/1969 | Kingsley, Jr. et al. | ........ 55/490 |
| 4,728,422 A | 3/1988 | Bailey | |
| 5,766,464 A * | 6/1998 | Campbell | ............. B01D 15/00 174/14 R |
| 6,391,200 B2 | 5/2002 | Pulek et al. | |
| 7,008,461 B2 * | 3/2006 | Kuki et al. | ................... 55/282.3 |
| 8,038,877 B2 | 10/2011 | Stausberg et al. | |
| 2006/0169632 A1 * | 8/2006 | Suzuki et al. | ............ 210/493.1 |
| 2008/0290013 A1 | 11/2008 | Stausberg et al. | ....... 210/167.04 |

FOREIGN PATENT DOCUMENTS

| | | |
|---|---|---|
| DE | 69906109 | 12/2003 |
| EP | 1 994 974 A2 | 11/2008 |
| GB | 2175222 | 4/1989 |
| JP | S5624010 | 3/1981 |

(Continued)

OTHER PUBLICATIONS

Oxford Dictionary (Concise Oxford Dictionary, 10th ed., ed. by Judy Pearsall, pub. Oxford University Press, New York, 1999, 4 pages).*

(Continued)

*Primary Examiner* — Bobby Ramdhanie
*Assistant Examiner* — Denise R. Anderson
(74) *Attorney, Agent, or Firm* — Grossman, Tucker, Perreault & Pfleger, PLLC

(57) ABSTRACT

A filter medium for the filtration of oil, in particular in the oil circuit of gear mechanisms and internal combustion engines, comprises a first and a second filtration layer, the first filtration layer comprising an open filtration medium and being arranged on the second filtration layer comprising a tight filtration medium, an intermediate chamber being arranged between the first and the second filtration layer, so that the first and the second filtration layer are set apart from each other in the region of the intermediate chamber in the direction of filtration.

13 Claims, 4 Drawing Sheets

(56) References Cited

FOREIGN PATENT DOCUMENTS

| | | |
|---|---|---|
| JP | 61-38607 | 2/1986 |
| JP | H02175133 | 7/1990 |
| JP | H0352608 | 3/1991 |
| JP | H07124415 | 5/1995 |
| JP | 2006316902 | 11/2006 |
| KR | 1020050036097 | 4/2005 |
| KR | 100616712 | 8/2006 |

OTHER PUBLICATIONS

Oxford Dictionary, "Concise Oxford Dictionary Tenth Edition," ed. Judy Pearsall, pub. Oxford University Press, New York, 1999, 3 pages.*

* cited by examiner

FILTER MEDIUM FOR AN OIL FILTER

CROSS-REFERENCE TO RELATED APPLICATIONS

This application claims priority to foreign Patent Application DE 10 2008 027 663.4, filed on Jun. 10, 2008, the disclosure of which is incorporated herein by reference in its entirety.

FIELD OF THE INVENTION

The present invention relates to a filter medium. More particularly, the present invention relates to a filter medium for the filtration of oil.

BACKGROUND OF THE INVENTION

Previously known filter media in the region of oil filters have the drawback, on the one hand, that, on use of efficient filter media, in particular at low temperatures (pressure filter media), considerable losses in pressure occur at low to moderate dirt pick-up capacity. Although low filtration media display an acceptable loss in pressure at high dirt pick-up capacity, they do not have high filtration efficiency. And the known woven fabrics for filtration purposes also have only low dirt pick-up capacity and in addition do not attain high efficiency. Specifically in the field of suction filters (maximum attainable reduced pressure of 1 bar), the foregoing problems hamper efficient and long-lasting filtration results.

SUMMARY OF THE INVENTION

Embodiments of the present invention advantageously provide a filtration medium which overcomes the drawbacks mentioned hereinbefore and is suitable in particular for use in the field of suction filters. Furthermore, a particularly advantageous use consists in the use of the filtration medium according to the invention in a suction filter.

According to an embodiment of the present invention, an intermediate chamber is arranged between [a] first and second filtration layer, so that the first and the second filtration layer are set apart from each other in the region of the intermediate chamber in the direction of filtration. An important aspect of the present invention thus consists in the sandwich-like construction of the filter medium, a first filtration layer being set apart from a second filtration layer via an intermediate space which in operation is filled with oil. It is important in this regard that the intermediate space is not obtained by placing the first and the second filtration layer loosely one above the other; on the contrary, the two layers have relative to each other a predefined spacing, which is also preserved in operational use, in the direction of filtration. The first filtration layer comprises in this case an open filter medium and the second filtration layer comprises a tight filter medium. The second filtration layer thus consists of a tighter filter medium than the first filtration layer.

Preferably, the filtration medium has, in order to obtain the intermediate chamber, a frame element arranged between the first and the second filtration layer. In this case, the dimensions of the frame element are designed in such a way that the first and the second filtration layer do not in operation of the filter medium rest one on the other, for example as a result of any possible extensibility of the filter materials; on the contrary, the spacing of the two filtration layers relative to each other is preserved even in operation. Of course, the frame element may in this case be made of one part or a plurality of parts.

The use of a frame element forming a plurality of intermediate chambers is outstanding with regard to reliability and efficiency. In this case, the filtration medium thus comprises a plurality of intermediate chambers positioned next to one another in the surface. This allows, in particular, especially large filter surfaces having a variable contour to be obtained using the filter medium according to the invention.

Preferably, for each intermediate chamber, a respective through-hole is arranged in the second filtration layer comprising a tight filtration medium. This possibility allows the filtration medium to be used over an extensive viscosity range as, in particular in the case of high viscosities, such as is the case for example at low temperatures, the oil does not completely filter via the second, tight filtration layer.

The filtration medium displays its advantageous effects in a particularly impressive manner when used in a suction filter with a filter medium according to one of the preceding claims.

In summary, the specific arrangement according to the invention leads as a result to the following advantages:

- Low loss in pressure at low flow velocities and high viscosities (for example—30° C.).
- High efficiency at low viscosities (<0.01 Pas) and relatively high throughflow velocity.
- Inhomogeneous charging of the open filter medium and homogeneous charging of the tight filter medium.
- Reductions in overall height by approx. 100%-300% (compared to conventional multilayer filter media in the region of oil filters) to approx. 2-3 mm are possible at the same or even improved performance levels.
- The precise behavior of the filter medium can be individually designed so as to be optimized for the particular application (as desired by the customer). Smart selection of the various filter media, hole diameters and grid spacer design and the ratios thereof is necessary and possible for this purpose. Using further filter layers having holes and further corresponding grid spacer it is possible to optimize the capacity and the filtration efficiency further.
- The sandwich-like construction significantly improves the discharge of air in the filter and thus undesirable cavitation effects for the pump. In particular, it is done in each field by the driving stream which ensures the required velocity for air discharge through the first layer. The air discharge can be further optimized by connecting the first layer and the grid spacer together. The connection prohibits a cross-flow between the individual intermediate chamber so that an air accumulation cannot take place under the first layer. This connection has no effect on the filtration.
- The compact design allows manufacture as a flat product.
- The compact design allows the configuration of a filter as a pocket filter.
- The compact design allows configuration as a pleated filter.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

BRIEF DESCRIPTION OF THE DRAWINGS

The invention will be described in greater detail hereinafter based on an exemplary embodiment illustrated in the drawings.

DETAILED DESCRIPTION

Figure 1:
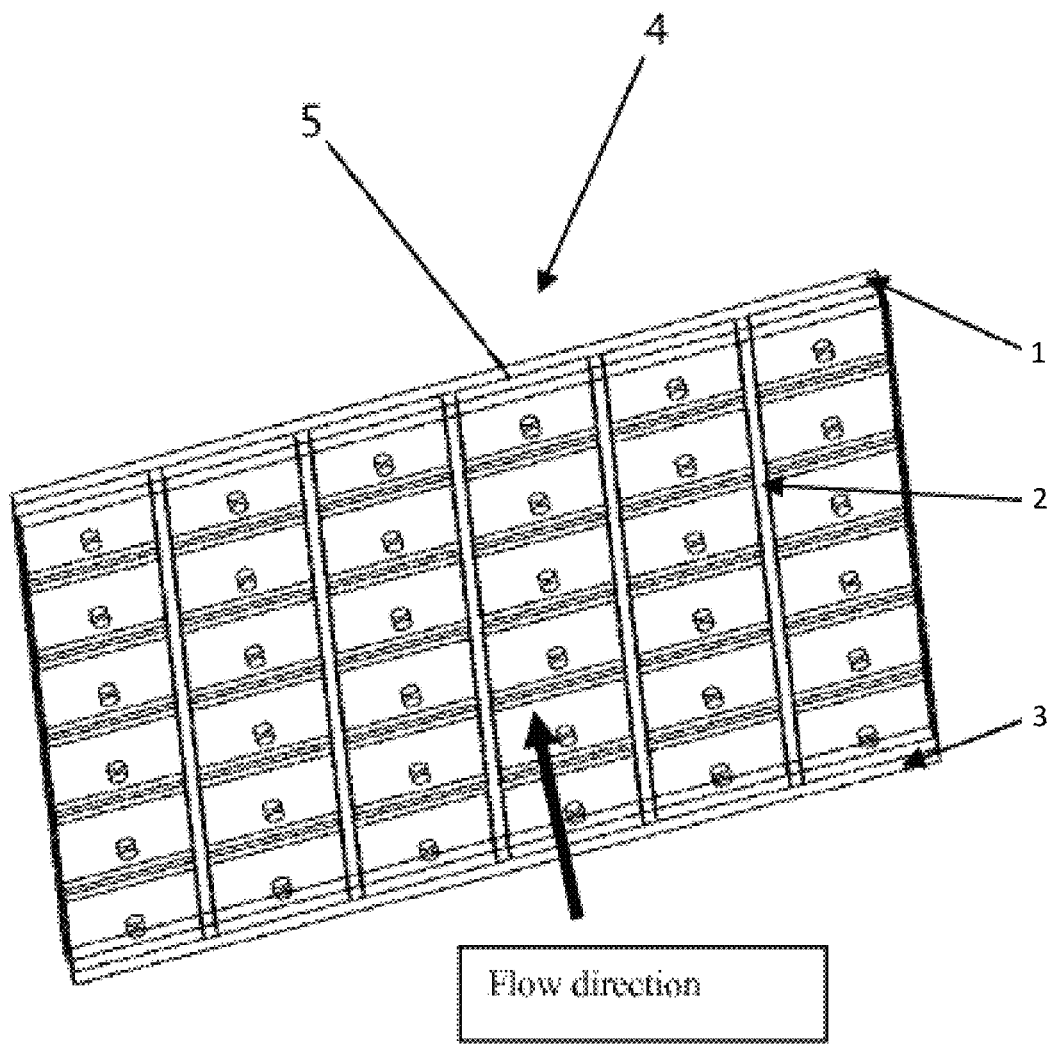
FIG. 1 is a schematic perspective phantom side view onto a filter medium, according to an embodiment of the present invention.

The invention will now be described with reference to the drawing figures, in which like reference numerals refer to like parts throughout.

According to FIG. 1, the filter medium 4 comprises a first filtration layer 1 made of an open filter medium, a grid spacer 2 forming the intermediate chambers 5 in the surface of the filter medium 4, and a second filtration layer 3 made of a tight filter medium, a through-opening 6 being arranged in the second filtration layer 3 for each intermediate chamber. The first filtration layer 1, the grid spacer 2, forming the intermediate chambers 5, and the second filtration layer 3 are arranged on one another in a sandwich-like manner, the grid spacer being arranged between the two filtration layers 1 and 3 and setting said filtration layers apart from each other.

Figure 3:
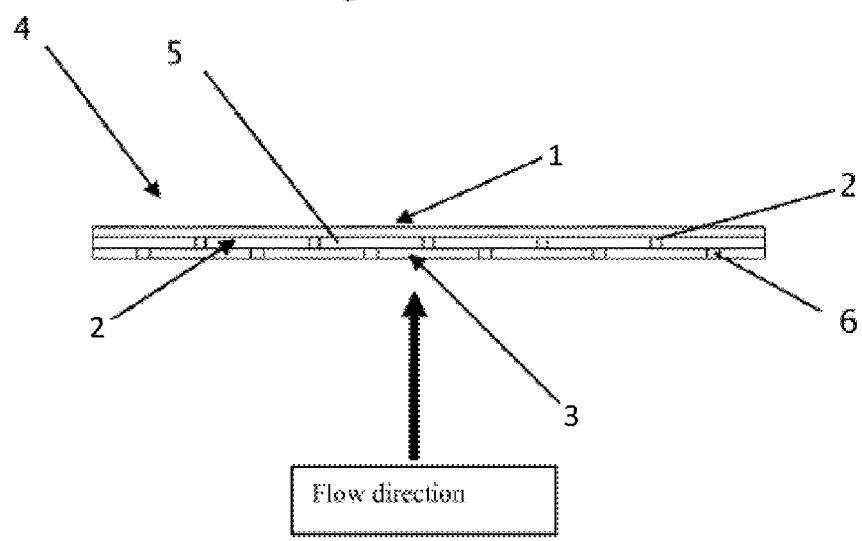
FIG. 3 is a schematic sectional view through the filter medium from FIG. 1.

This sandwich construction may be seen particularly clearly from FIG. 3. The arrangement of the grid spacer 2 between the two filtration layers 1 and 3 forms the intermediate chambers 5 through which the oil running through the filter medium 4 passes from one filtration layer to the other filtration layer. In the specific exemplary embodiment, the oil flows, as shown in FIGS. 1 and 3, through the filter medium 4, coming from the second filtration layer 3, and thus passes first the tight filter medium, then the intermediate chamber 5 and finally leaves the filter medium 4 via the first filtration layer 1. In principle, it is however also possible for the oil to flow through in the opposite direction.

Figure 2:
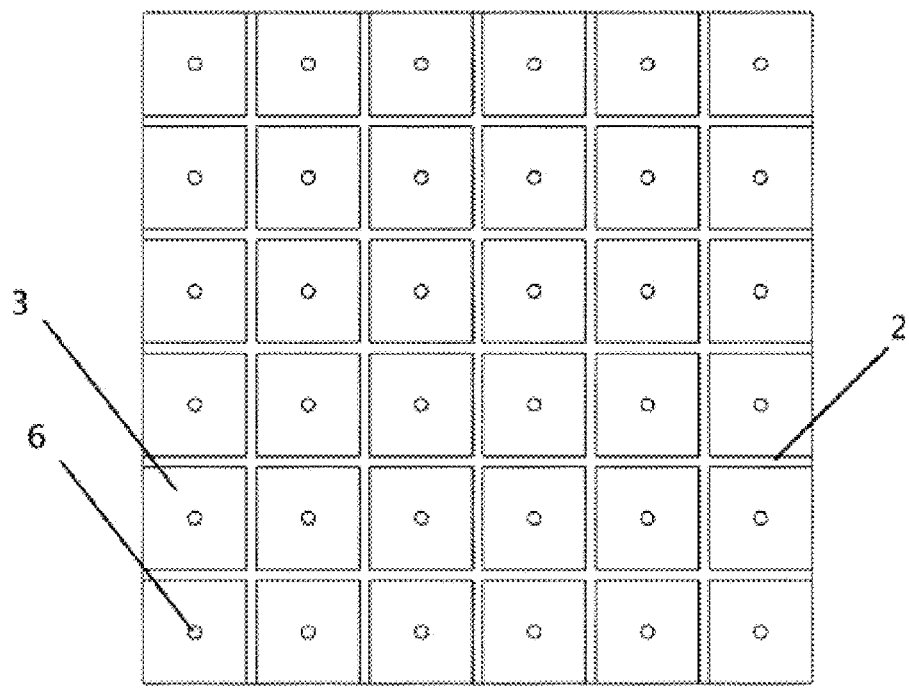
FIG. 2 is a schematic plan view onto the grid spacer and the first filtration layer of the filter medium from FIG. 1.

FIG. 2 illustrates the embodiment of the grid spacer. The grid spacer consists of longitudinal and transverse struts which together form the square intermediate chambers 5. Furthermore, FIG. 2 illustrates the positioning of the through-openings 6 relative to the intermediate chambers 5. For each intermediate chamber 5, there is provided in the second filtration layer 3 a through-opening 6 which is arranged in the second filtration layer 3 in each case centrally with respect to the intermediate chamber 5.

Figure 4:
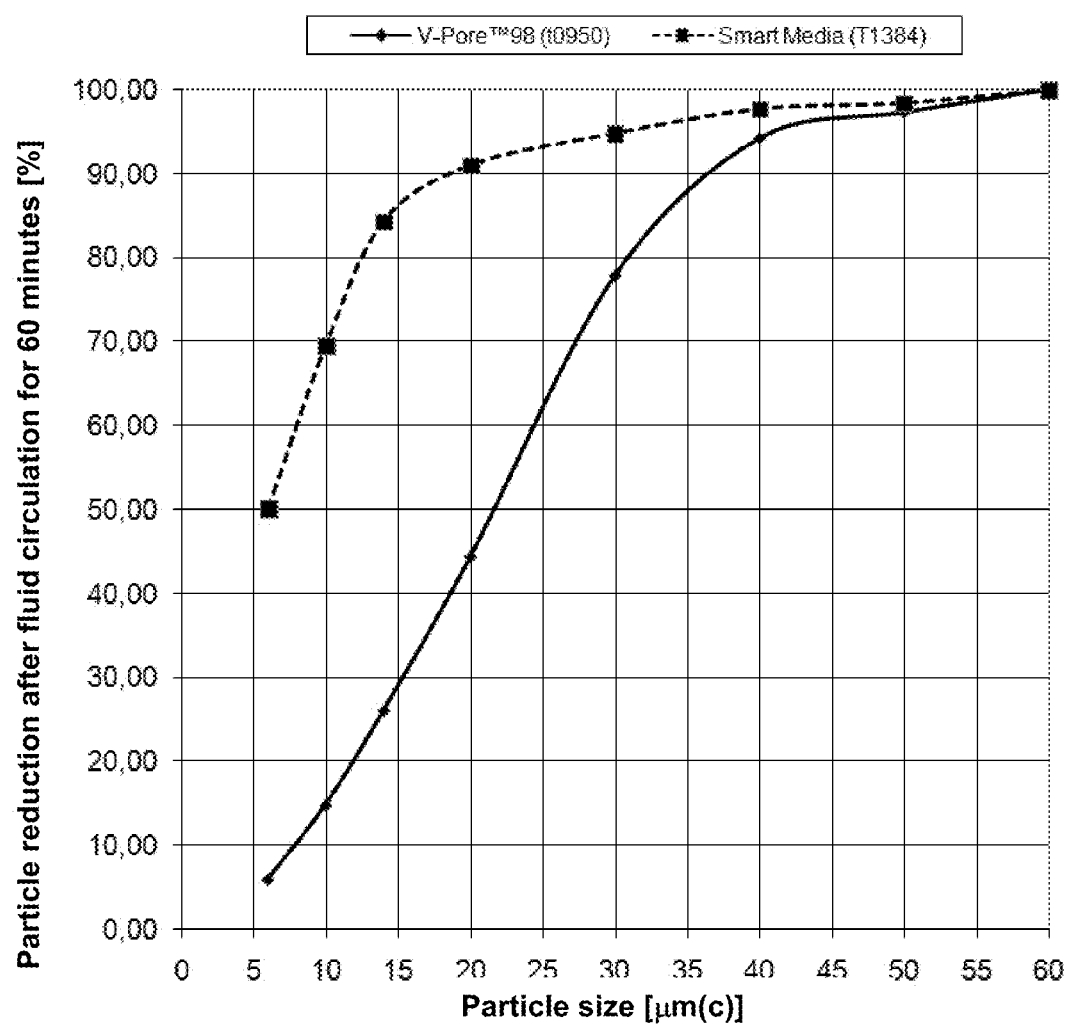
FIG. 4 is a schematic illustration of particle reduction over particle size.

FIG. 4 illustrates the superior particle reduction of the filter medium according to the invention ("SmartMedia") over a standard suction filter medium ("V-Pore 98"). This clearly shows that significantly improved particle reductions are obtained, in particular in the specified low particle size range between 5 and 40μ(c).

Figure 5:
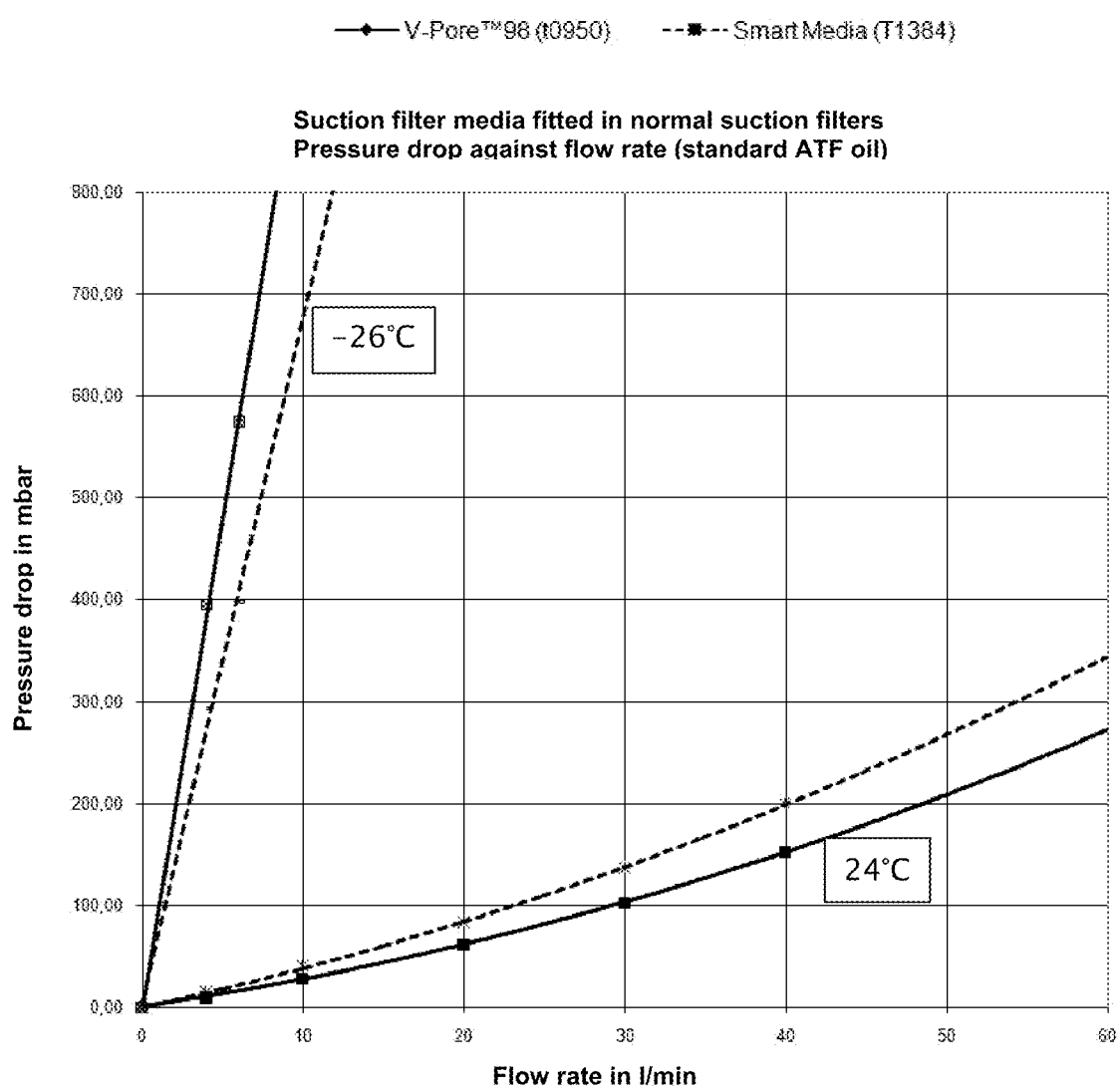
FIG. 5 is a schematic illustration of the drop in pressure over throughflow.

Finally, FIG. 5 illustrates the advantageous properties of the filtration medium according to the invention in respect of the drop in pressure in relation to the throughflow, FIG. 5 repeating the comparison with a standard suction filter medium ("V-Pore 98") and at temperatures of 24° C. and −26° C.

The physical mode of operation of the filter medium according to the invention will be described hereinafter in greater detail.

A) State: Low Oil Viscosity High Flow Velocity (Warm Oil)

The pressure is transmitted directly into the intermediate chamber through the open filter medium (first filtration layer 1) almost without loss (cf. Darcy's Law). The pressure in the intermediate chamber 5 is determined by the propulsive jet of the dynamic pressure produced from the bore, the loss in the bore (flow through a pipe) and the loss in the intermediate chamber 5 ("flow between 2 plates"). In this state, the dynamic pressure decisively determines the reduced pressure in the intermediate chamber 5. The smaller the hole, the greater the dynamic pressure and the higher the reduced pressure in the intermediate chamber 5. This reduced pressure in the intermediate chamber 5 ensures that an appropriate proportion flows through the tight filter medium (second filtration layer 3) ("Darcy's Law"). The diameter of the hole (dynamic pressure) thus determines the proportion flowing through the tight filter medium (second filtration layer 3). The relationship is not linear, but quadratic.

B) State: High Oil Viscosity, Low Flow Velocity (Cold Oil)

The pressure is transmitted into the intermediate chamber 5 through the open filter medium (first filtration layer 1) with low loss. The pressure in the intermediate chamber 5 is determined by the propulsive jet of the dynamic pressure produced from the bore, the loss in the bore (flow through a pipe) and the loss in the intermediate chamber 5 (flow between 2 plates). In this state, the diameter of the bore and the height of the chamber decisively determine the reduced pressure in the intermediate chamber. The smaller the hole and the flatter the chamber, the higher the overall loss in pressure of the filter medium. In this state, the tight filter medium (3) is bypassed almost completely (Darcy's Law). The diameter of the hole, length of the hole and the height of the chamber thus determine the overall loss of the filter medium as a whole.

A field of the first layer whose surface area basically corresponds to the area of an intermediate chamber 5 preferably has a size of 10 mm×10 mm when used as a suction filter. For pressure filtration a field size of 7 mm×7 mm should be preferred. The field preferably has a square shape but also other forms like a rectangle are imaginable. For these preferred field sizes the grid spacer 2 has a preferred grid height of 1.5 mm to 2.5 mm. It turned out that a too short grid height leads to a increased flow loss.

It further turned out that a hole diameter of 1 mm to 3 mm is sufficient for the whole area of the suction filtration. For pressure filtration the preferred hole diameter is between 0.1 mm and 3 mm.

In principle, any material comes into consideration as fine filter media. Preferably, filter media with a beta value of beta 5 greater than 1000 to beta 35 greater than 1000 are used. Also, there is a wide range of materials for coarse filter media. In this respect, the decisive factors are the component to be protected as well as the crucial particle size.

The viscosity preferably ranges between 0.001 and 30 Pas. Thereby, flow velocities of 0 to 100 mm/s or higher have been observed.

The application areas of the filter according to the invention are, for example, environments in which strong fluctuations of viscosity and multiple percolation often occur, for example gear with valves (for protecting the valves, pumps, bearing, automatic gear), large-scale gear (wind energy plant), differential gear, power steering or filtration in engine area, aviation and aerospace industry. A water filtration is also imaginable even if the fluctuation of viscosity in this case is rather low.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A filter medium for filtration of oil in an oil circuit, the filter medium comprising:
    a first filtration layer;
    a second filtration layer; and
    a grid spacer comprising a first side, a second side and a plurality of struts, the plurality of struts defining a plurality of discrete intermediate chambers that extend from the first side of the grid spacer to the second side of the grid spacer;
    the first filtration layer is discrete from the grid spacer;
    the second filtration layer is discrete from the grid spacer;
    the first filtration layer's filter media is relatively open, compared to the second filtration layer's filter media;
    each of the plurality of discrete intermediate chambers comprises a first open end proximate the first side of the grid spacer and a second open end proximate the second side of the grid spacer;
    the first and second filtration layers are disposed on and coupled to the first and second sides of the grid spacer, respectively, such that:
        the first filtration layer covers the first open end of each of the plurality of discrete intermediate chambers;
        the second filtration layer covers the second open end of each of the plurality of discrete intermediate chambers; and
        said first and second filtration layers are spaced apart from one another in a direction of fluid flow in said oil circuit;
    said second filtration layer comprises a plurality of through-holes, wherein each of said plurality of through-holes extends through the second filtration layer's filter media and is substantially aligned with the second open end of a corresponding one of said plurality of discrete intermediate chambers;
    the first and second filtration layers are each configured to filter an oil flow; and
    each of the plurality of through-holes is configured to allow a portion of an oil flow to bypass the second filtration layer's filter media without being filtered by the second filtration layer's filter media.

2. The filter medium of claim 1, wherein each of said plurality of through-holes has a diameter in the range of 0.1 mm to 3 mm.

3. The filter medium of claim 1, wherein each of the plurality of discrete intermediate chambers is aligned with a single one of said plurality of through-holes.

4. The filter medium of claim 1, wherein said filter medium is planar.

5. An oil filter, comprising:
    a first filtration layer of coarse filter media;
    a second filtration layer of fine filter media; and
    a grid spacer comprising a first side, a second side, and a plurality of struts, the plurality of struts defining a plurality of discrete intermediate chambers that extend from the first side of the grid spacer to the second side of the grid spacer;
    wherein:
        said first and second filtration layers are each discrete from said grid spacer;
        the second filtration layer's fine filter media has a beta value of beta 35 greater than 1000;
        the first filtration layer's coarse filter media is relatively open, as compared to the second filtration layer's fine filter media;
        each of the plurality of discrete intermediate chambers comprises a first open end proximate the first side of the grid spacer and second open end proximate the second side of the grid spacer;
        the first and second filtration layers are disposed on and coupled to the first and second sides of the grid spacer, respectively, such that:
            the first open end of each of the plurality of discrete intermediate chambers is covered by said second filtration layer;
            the second open end of each of the plurality of discrete intermediate chambers is covered by the first filtration layer; and
            said first and second filtration layers are spaced apart from one another in a direction of fluid flow in an oil circuit;
        the second filtration layer's fine filter media further comprises a plurality of through-holes formed therethrough, wherein each of said plurality of through-holes extends through the second filtration layer's fine filter media is substantially aligned with a center of the second open end of a corresponding one of said plurality of discrete intermediate chambers;
        the first and second filtration layers are each configured to filter an oil flow; and
        each of the plurality of through-holes is configured to allow at least a portion of an oil flow to bypass the second filtration layer's fine filter media without being filtered by the second filtration layer's fine filter media.

6. The oil filter of claim 5, wherein said second filtration layer's of said fine filter media has a beta value of beta 5 greater than 1000.

7. The oil filter of claim 5, wherein each of said plurality of through-holes has a diameter ranging from 0.1 mm to 3 mm.

8. The oil filter of claim 5, wherein said oil filter is planar.

9. A method of filtering oil in an oil circuit, the method comprising:
    providing a filter medium in an oil circuit wherein the filter medium comprises:
        a first filtration layer;
        a second filtration layer; and
        a grid spacer comprising a first side, a second side and a plurality of struts, the plurality of struts defining a plurality of discrete intermediate chambers that extend from the first side of the grid spacer to the second side of the grid spacer; and
    causing oil in said oil circuit to flow through said filter medium from the second filtration layer to the first filtration layer, thus filtering the oil;

wherein:
the first filtration layer is discrete from the grid spacer;
the second filtration layer is discrete from the grid spacer;
the first filtration layer's filter media is relatively open, compared to the second filtration layer's filter media;
each of the plurality of discrete intermediate chambers comprises a first open end proximate the first side of the grid spacer and a second open end proximate the second side of the grid spacer;
the first and second filtration layers are disposed on and coupled to the first and second sides of the grid spacer, respectively, such that:
the first filtration layer covers the first open end of each of the plurality of discrete intermediate chambers;
the second filtration layer covers the second open end of each of the plurality of discrete intermediate chambers; and
said first and second filtration layers are spaced apart from one another in a direction of fluid flow in said oil circuit;
said second filtration layer comprises a plurality of through-holes, wherein each of said plurality of through-holes extends through the second filtration layer's filter media and is substantially aligned with the second open end of a corresponding one of said plurality of discrete intermediate chambers;
the first and second filtration layers are each configured to filter an oil flow; and
each of the plurality of through-holes is configured to allow a portion of an oil flow to bypass the second filtration layer's filter media without being filtered by the second filtration layer's filter media.

10. The method of claim 9, further comprising said filter medium in conjunction with a gear mechanism.

11. The method of claim 9, wherein the oil circuit is included in an internal combustion engine.

12. The method of claim 9, wherein each of said plurality of through-holes has a diameter ranging from 0.1 mm to 3 mm.

13. The method of claim 9, wherein said filter medium is planar.

\* \* \* \* \*